(12) United States Patent
Hicks et al.

(10) Patent No.: US 6,516,330 B1
(45) Date of Patent: Feb. 4, 2003

(54) COUNTING SET BITS IN DATA WORDS

(75) Inventors: Daniel Rodman Hicks, Byron, MN (US); Andrew Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,681

(22) Filed: Dec. 1, 1999

(51) Int. Cl.[7] .................................................. G06F 7/00
(52) U.S. Cl. ....................................................... 708/210
(58) Field of Search ......................................... 708/210

(56) References Cited

U.S. PATENT DOCUMENTS

| | | | | |
|---|---|---|---|---|
| 4,486,848 A | * | 12/1984 | Kaminski ................. | 708/210 |
| 4,607,176 A | * | 8/1986 | Burrows et al. ........... | 326/113 |
| 5,682,405 A | * | 10/1997 | Smith ........................ | 375/224 |
| 5,717,616 A | * | 2/1998 | Morris ....................... | 708/210 |
| 5,734,599 A | * | 3/1998 | Lee et al. .................. | 708/210 |
| 5,995,029 A | * | 11/1999 | Ryu ............................ | 341/101 |

* cited by examiner

*Primary Examiner*—David H. Malzahn
(74) *Attorney, Agent, or Firm*—Owen J. Gamon; Robert R. Williams

(57) ABSTRACT

Counting the number of set bits in an n-bit data word in a data processing system. The process involves generating at least $p_1$ intermediate n-bit words, where $1<p_1<n$, by masking and shifting the data word such that each intermediate word has $n/p_1 p_1$-bit fields and n of the fields of the intermediate words represent the values of respective bits of the data word. The intermediate words are then summed to generate an n-bit derivative word having $n/p_1 p_1$-bit fields whereby each field of the derivative word represents the sum of a respective group of bits of the data word. The fields of the derivative word can then be summed in various ways by performing shift, add and mask operations on the derivative word. The resulting sum value represents the number of set bits in the data word.

42 Claims, 5 Drawing Sheets

| | | |
|---|---:|---|
| (1) ... | x | 11111111111111111111111111111111 |
| (2) ... | x&55555555 | 01010101010101010101010101010101 |
| (3) ... | (x>>>1)&55555555 | 01010101010101010101010101010101 |
| (4) ... | a | 10101010101010101010101010101010 |
| (5) ... | a&33333333 | 00100010001000100010001000100010 |
| (6) ... | (a>>>2)&33333333 | 00100010001000100010001000100010 |
| (7) ... | x | 01000100010001000100010001000100 |
| (8) ... | x&0f0f0f0f | 00000100000001000000010000000100 |
| (9) ... | (x>>>4)&0f0f0f0f | 00000100000001000000010000000100 |
| (10)... | a | 00001000000010000000100000001000 |
| (11)... | a | 00001000000010000000100000001000 |
| (12)... | (a>>>8) | 000010000000100000001000 |
| (13)... | a | 00001000000100000001000000010000 |
| (14)... | a | 00001000000100000001000000010000 |
| (15)... | (a>>>16) | 0000100000010000 |
| (16)... | a | 00001000000100000001100000100000 |
| (17)... | a | 00001000000100000001100000100000 |
| (18)... | ff | 11111111 |
| (19)... | sum value | 00100000 |

```
(1) ...                 x  11111111111111111111111111111111

(2) ...       x&55555555   01010101010101010101010101010101
(3) ... (x>>>1)&55555555   01010101010101010101010101010101
(4) ...                 a  10101010101010101010101010101010

(5) ...       a&33333333   00100010001000100010001000100010
(6) ... (a>>>2)&33333333   00100010001000100010001000100010
(7) ...                 x  01000100010001000100010001000100

(8) ...       x&0f0f0f0f   00000100000001000000010000000100
(9) ... (x>>>4)&0f0f0f0f   00000100000001000000010000000100
(10)...                 a  00001000000010000000100000001000

(11)...                 a  00001000000010000000100000001000
(12)...         (a>>>8)            000010000000100000001000
(13)...                 a  00001000000100000001000000010000

(14)...                 a  00001000000100000001000000010000
(15)...        (a>>>16)                    0000100000010000
(16)...                 a  00001000000100000001100000100000

(17)...                 a  00001000000100000001100000100000
(18)...                ff                          11111111
(19)...         sum value                          00100000
```

(10)... x&ffff                               1000100010001000

COUNTING SET BITS IN DATA WORDS

FIELD OF THE INVENTION

This invention relates generally to methods and apparatus for counting the number of set bits in data words in data processing systems.

BACKGROUND

Many data processing applications require the number of set bits, i.e. bits of value "1", in a data word to be counted. Often this operation must be repeated many times, as in graphics or cryptography applications for example, so the process can be a time consuming one.

Various methods for counting the number of set bits in data words are known. One method is to check each bit of the data word in turn and keep a running total of the number of set bits found by incrementing a counter when the checked bit is a "1". Checking the bits in turn requires a time varying linearly with the length of the word, and, assuming the process branches to increment the counter only if the checked bit is set, the total time for the operation is dependent on the content of the word and thus varies from word to word. Another method is to clear the least significant set bit of the word using the technique x=x & (x−1), where "&" signifies the logical AND operation, and keep a count of the number of times that a set bit has been cleared. The process continues until the word is all zeros at which point the count is returned. The time taken by this process is again content dependent, varying according to the number of set bits in the word. The branches required can be slow, and unrolling the loop to avoid branches would substantially increase the code length. A further method is to use a lookup table to count bits in part of the word and then sum the results from the lookup operations for the individual parts. In particular, a lookup table may be provided which indicates the bit count for each possible value of a nibble, byte or 16-bit string. For 16-bit strings for example, a table of 65536 count values, indexed by string value, is provided. Each count value gives the set-bit count for the associated string value. For words longer than sixteen bits, each 16-bit string is looked up and the resulting count values are summed to obtain the total set-bit count. This type of process involves memory references for accessing the lookup table which can be slow on some system architectures and requires a lot of memory. Large lookup tables may not fit into processor memory caches so storage fetches can be expensive in terms of processor time.

SUMMARY OF THE INVENTION

According to one aspect of the present invention there is provided a method of counting the number of set bits in an n-bit data word in a data processing system, the method comprising:

(a) generating at least $p_1$ intermediate n-bit words, where $1<p_1<n$, by masking and shifting the data word such that each intermediate word has $n/p_1$ $p_1$-bit fields and n of the fields of the intermediate words represent the values of respective bits of the data word;

(b) summing the intermediate words to generate an n-bit derivative word having $n/p_1$ $p_1$-bit fields whereby each field of the derivative word represents the sum of a respective group of bits of the data word; and (c) summing the fields of the derivative word by performing shift, add and mask operations on thee derivative word, whereby the resulting sum value represents the number of set bits in said data word.

In accordance with the present invention, therefore, mask and shift operations are initially performed on the n-bit data word to generate at least $p_1$ intermediate n-bit words where $p_1$ is an integer between 1 and n. Each intermediate word has $n/p_1$ $p_1$-bit fields and n of the fields of the intermediate words represent the values of respective bits of the data word. For example, for n=32 and $p_1$=2, two intermediate 32-bit words may be generated each having sixteen 2-bit fields. Each of the thirty-two 2-bit fields of the intermediate words then indicates the value of a respective one of the thirty-two bits of the input data word. Thus, a set bit in the data word is represented by the 2-bit field 01, and an unset bit in the data word is represented by the 2-bit field 00. When the intermediate words are then summed in step b above, a derivative 32-bit word having sixteen 2-bit fields is obtained where each 2-bit field represents the sum of two bits of the data word. These fields are then summed by performing further shift, add and mask operations in step c above. The resulting sum value is therefore the sum of all bits in the original data word which thus gives the number of set bits in the word. In embodiments of the present invention therefore, the number of set bits in a data word can be counted simply by performing a series of shift, add and mask operations which are relatively inexpensive processor operations. Since branching or lookup operations are not required, the process can be performed more quickly than prior methods discussed above. Further, the processing time is independent of the content of a data word, so for a given word length the set-bit count can be obtained in a fixed time which is of substantial benefit to real time applications. Moreover, the process lends itself particularly well to implementation by processors with multiple concurrent execution units, allowing further speed gains to be achieved where such processors are provided.

For the sake of efficiency it is preferred that $p_1$ intermediate words are generated in step a above, though methods can be envisaged where more than $p_1$ intermediate words are generated in which case there will inevitably be more than n $p_1$-bit fields overall, the additional fields in the n-bit words then being zero-value fields.

Where n is exactly divisible by $p_1$, each intermediate word will of course have an integral number of $p_1$-bit fields. However, the value of $p_1$ need not be selected such that n is exactly divisible by $p_1$, and in such cases each intermediate word, and hence the resulting derivative word, will have a fractional $p_1$-bit field, ie. a partial field having less than $p_1$ bits. At least one of these fractional or partial fields of the intermediate words will represent the value of one bit of the data word. The process is unaffected by the presence of such partial fields since in subsequent shift and add operations the "missing bits" will simply be treated as zeros.

The shift, mask and add operations in step c above can be performed in various ways to sum the fields of the derivative word, but in preferred embodiments step c comprises the steps of:

(c1) masking and shifting the derivative word to generate at least $p_i$ intermediate n-bit words, where $1<p_1<n$ and i=2 in a first pass, each having $n/x_i$ $x_i$-bit fields, where $x_i=p_i*x_{i-1}$ and $x_1=p_1$, $n/x_{i-1}$ of which fields represent the values of respective fields of the derivative word;

(c2) summing the intermediate words from step c1 to generate a new n-bit derivative word having $n/x_i$-bit fields each of which represents the sum of a respective group of bits of the data word; and (c3) iteratively performing steps c1 and c2 for the new derivative word with i=i+1 in each successive pass, at least until a new derivative word with $x_i$-bit fields is obtained where $2^{x_i} > n$.

In such embodiments, therefore, the process is generally an iterative one, steps c1 and c2 corresponding generally to steps a and b above although the value of $p_i$ may be different in successive steps. As will be apparent from the detailed examples described below, the purpose of generating the intermediate words in step c1 with larger bit-fields than the last-generated derivative word is to allow groups of these fields to be summed in step c2 without overflow, ie. without the resulting sum bit-strings exceeding the field size. In some cases, however, the last-generated derivative word may be such that the maximum possible value of the sum of at least two of its fields will not overflow the existing field size of that derivative word. In such cases steps c1 and c2 can be simplified to reduce the number of processing operations required. In particular, in any pass of step c1 for a derivative word having $x_{i-1}$-bit fields, if the maximum possible value V of the sum of $q \geq 2$ fields of the derivative word satisfies $V < 2^{x_{i-1}}$, steps c1 and c2 may be modified to:

summing fields of the derivative word in groups of q fields by performing shift and add operations on the derivative word and masking the resulting word to eliminate redundant fields, thereby generating a new derivative word having $x_i$-bit fields each of which represents the sum of respective groups of bits of the data word. The shift, add and masking operations in modified steps c1 and c2 may be performed such that the new derivative word is an n-bit word having $n/x_i$ $x_i$-bit fields, where $x_i = q * x_{i-1}$. (The multiplication operator is represented by the symbol "*".) Alternatively, the shift, add and masking operations in modified steps c1 and c2 may be performed such that $x_i = x_{i-1}$ and the new derivative word has $n' = n/q$ bits. For this latter case, in step c3 and subsequent passes of steps c1 and c2 n is replaced by n'. Examples of these cases will be explained in more detail below.

According to step c3 above, steps c1 and c2 (in their modified or unmodified forms as appropriate) may be iteratively performed just until a new derivative word is obtained with $x_i$-bit fields satisfying $2^{x_i} > n$. Here, the field size $x_i$ is sufficiently large so that, for any possible value of the original n-bit word, all the fields of the derivative word can be summed without overflow. That is, a bit string of $x_i$-bits is sufficient to represent the value of the sum of n set bits. Thus, when such a derivative word is obtained, the $x_i$-bit fields may simply be summed by performing shift and add operations, whereby said resulting sum value indicating the set-bit count is obtained. The shift and add operations performed in this step may be implemented by multiplication of the derivative word as will be illustrated below. Alternatively in step c3, steps c1 and c2 may be iterated until a new derivative word is obtained with one field of $x_i = n$ bits, whereby said one field represents said resulting sum value.

It is to be appreciated that, where features are described herein with reference to a method of the invention, corresponding features may be provided in accordance with an apparatus embodying the invention, and vice versa. In particular, the present invention also provides a data processor comprising logic configured to perform a method as described above, and a data processing system including such a data processor.

BRIEF DESCRIPTION OF THE DRAWINGS

Preferred embodiments of the invention will now be described, by way of example, with reference to the accompanying drawings in which:

FIG. 2 illustrates various stages in operation of one method embodying the preferred embodiment for an exemplary 32-bit word;

FIG. 3 illustrates a modification to the method shown in FIG. 2;

FIG. 4 illustrates another modification to the method shown in FIG. 2;

FIG. 5 illustrates a further modification to the method shown in FIG. 2;

FIG. 6 illustrates the initial stages in operation of another method embodying the preferred embodiment.

DESCRIPTION OF THE PREFERRED EMBODIMENT

Methods embodying the invention can be implemented by processors of known form configured by appropriate software.

Figure 1A:
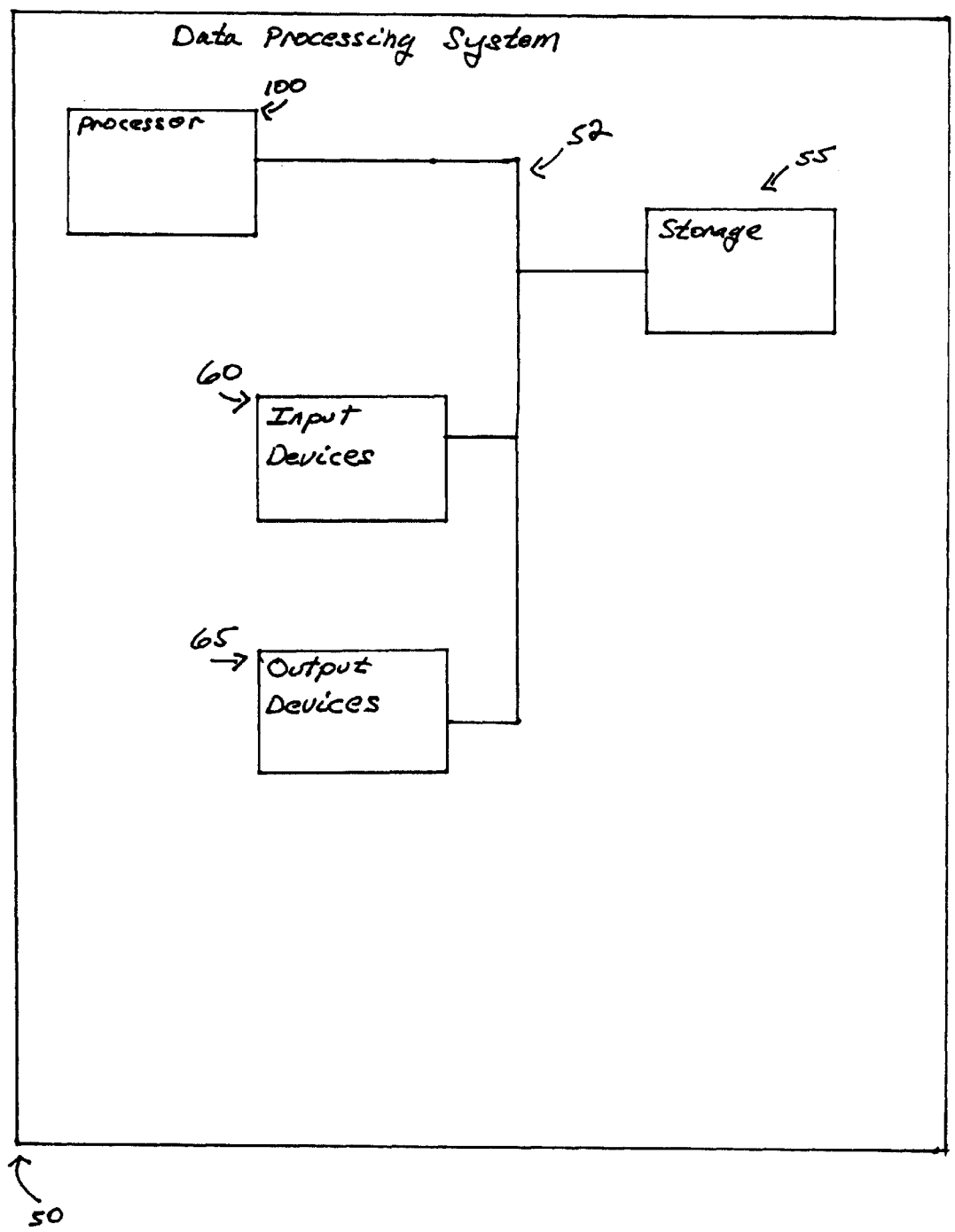
FIG. 1a is a block diagram of a data processing system of the preferred embodiment.

FIG. 1a is a block diagram of a computer system that can be used to implement the preferred embodiment. Data processing system 50 includes processor 100 attached via system bus 52 to storage 55, input devices 60, and output devices 65.

Processor 100 executes instructions and is further described below under the description for FIG. 1b. Processor 100 could be implemented using any appropriate processor such as the Power PC line of microprocessors available from IBM. Alternatively, processor 100 could be implemented using one of the 80X86 or Pentium processors, or any other type of processor, which are available from a number of vendors.

Storage 55 could comprise a number of individual volatile-memory modules that store segments of operating system and application software while power is supplied to data-processing system 50. The software segments are partitioned into one or more virtual memory pages that each contain a uniform number or virtual memory addresses. When the execution of software requires more pages of virtual memory that can be stored within volatile memory, pages that are not currently needed are swapped with the required pages, which are stored within non-volatile storage devices. Storage 55 could also comprise non-volatile storage devices, such as floppy diskettes, hard disk drives, or CD-ROM drives. Although storage 55 is drawn in FIG. 1a as being part of data processing system 50, storage 55 could be remote storage accessed by data processing system 50 via a bus, cable, I/O Processor, or communications link, including wireless communications.

Output devices 65 could be any device for presenting data to the user, including by not limited to screens or monitors, printers, speakers, text-to-speech applications, modems, cables, or communications links. Although output devices 65 are drawn as being a part of data processing system 50, they could be remote.

Input devices 60 could be any device for presenting data to data processing system 50, including but not limited to keyboards, graphic tablets, joysticks, trackballs, touch screens, track pads, modems, cables, or communications links. Although input devices 60 are drawn as being a part of data processing system 50, they could be remote.

While a specific hardware configuration is described herein along with various alternatives, the methods described could in general be practiced using any hardware configuration that allows counting the number of set bits in data words.

As will be described in detail below, aspects of the preferred embodiment pertain to specific method steps implementable on computer systems. In an alternative embodiment, the invention may be implemented as a computer program product for use with a computer system. The programs defining the functions of the preferred embodiment can be delivered to a computer via a variety of signal-bearing media, which include, but are not limited to: (a) information permanently stored on non-writable storage media (e.g., read only memory devices within a computer such as CD-ROM disks readable by a CD-ROM drive); (b) alterable information stored on writable storage media (e.g., floppy disks within a diskette drive or hard-disk drive); or information conveyed to a computer by a communications media, such as through a computer or telephone network, including wireless communications. Such signal-bearing media, when carrying computer-readable instructions that direct the functions of the present invention, represent alternative embodiments of the present invention. Storage 55 comprises any or all of the aforementioned signal-bearing media options (a), (b), or (c).

Figure 1B:
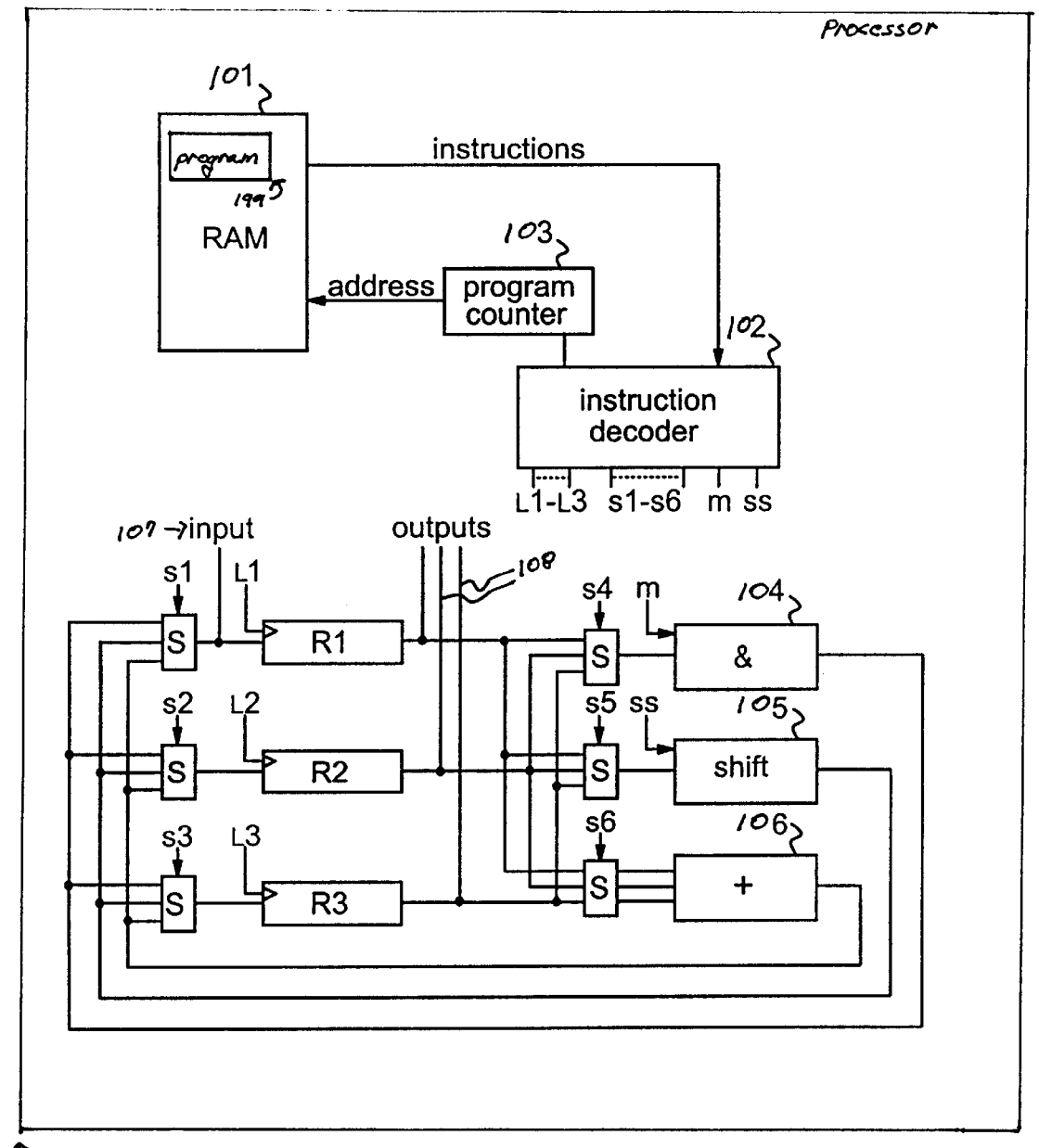
FIG. 1b is a schematic illustration of the main elements of a processor for implementing methods embodying the preferred embodiment.

FIG. 1b shows the main elements of one example of a processor for performing methods embodying the invention. Processor logic 100 includes a RAM 101 storing program code 199 comprising the set of instructions for enabling the processor to implement one of the methods to be described below when the number of set bits in a data word is to be determined. The software enabling implementation of embodiments of the invention may be supplied separately, as an element of the program code for a specific application in a processing system or otherwise, for loading in the processor in known manner. Alternatively, the processor may be supplied preconfigured with software for performing the required functions. Either way, the processor, so-configured by program code 199, constitutes a processor embodying the present invention. Program code 199 can be loaded from and stored in storage 55. Processor 100 is suitably programmed to carry out the preferred embodiment by program code 199, as described in more detail in the flowchart of FIG. 7. In the alternative, the function of FIG. 7 could be implemented by control circuitry throught the use of logic gates, programmable logic devices, or other hardware components in lieu of a processor-based system.

Instructions read out from the RAM 101 are supplied to an instruction decoder 102 which retrieves successive instructions from memory by way of a program counter 103 which supplies the address of the next instruction to be accessed to the RAM as required. The processor logic includes three registers R1, R2 and R3 in this example, though not all of these registers are required for some of the methods to be described below. Also in this example, three execution units 104, 105, and 106 are provided for performing logical AND (&), shift and add (+) operations respectively. The output of each execution unit 104, 105 and 106 is connected to one input of each of three selectors S as illustrated, the output of each selector forming the input to a respective register R1, R2 or R3. Control signals s1, s2 and s3 output by the instruction unit 102 to respective selectors S determine which of the three inputs to each selector is supplied to that selectors output and thus to the input of the associated register R1, R2 or R3. The selector output is latched to the associated register when a latch signal L1, L2 or L3 is applied to the register. The latch signals L1 to L3 are generated by the instruction decoder as indicated in the figure. The output of each register R1, R2 and R3 is connected as shown to one input of each of three further selectors S. The outputs of these selectors form the inputs to respective execution units 104, 105, and 106. Again, control signals s4, s5, and s6 supplied by the instruction decoder 102 determine which selector inputs are supplied to the outputs and hence to the associated execution unit.

The input selector to add-unit 106 may have two or three outputs, here three being shown to allow any combination of the three inputs to be supplied to the add-unit in dependence on the control signal s6. The &-unit 104 has a control input from the instruction unit 102 to which bit sequences to be used as a mask m are supplied in operation. The shift unit 105 also has a control input from the instruction unit 102 to which the shift ss to be used in a particular operation is supplied in use. An input 107 is provided for supplying a data word to be processed to the register R1. The contents of registers R1 to R3 can be read on register outputs 108 to enable the final sum value to be read out at the end of a processing operation. In this example, it will be assumed that the processor operates on 32-bit words so that all data lines in the apparatus of FIG. 1b consist of thirty-two parallel bit-lines.

When the number of set bits in a word is to be counted, the word is supplied to the input 107 and latched to register R1 by the instruction decoder 102. Successive instructions read from the RAM 101 are then implemented under control of the instruction decoder 102 to process the input word according to a method embodying the invention, whereby the resulting sum value, indicating the number of set bits, is obtained on one of the outputs 108. The series of operations performed by the processor in implementing a first embodiment of the invention will now be described. This first method is defined by the Java program listed below and will be described with reference to this program, though it will be appreciated that the actual instruction set stored in the RAM 101 may be a lower level code.

```
public static int sumy (int x) {
    int a = 0x55555555 & x;
    a += (x >>> 1) & 0x55555555;
    x = a & 0x33333333;
    x += (a >>> 2) & 0x33333333;
    a = x & 0x0f0f0f0f;
    a += (x >>> 4) & 0x0f0f0f0f;
    a += a >>> 8;
    a += a >>> 16;
    return a & 0xff;
}
```

At the start of the operation, the input 32-bit data word, defined as "x", is stored in register R1 as described above. According to the first line of the program, a new integer "a" is defined by masking the input word using the mask 0x55555555 where 0x signifies hexadecimal representation. Control signal s4 is therefore set to supply the output of R1 to &-unit 104, mask m=0x55555555 being supplied to this unit by the instruction decoder 102. The result "a" of the mask operation performed by unit 104 is supplied to the input of register R2 by appropriate setting of control signal s2 by instruction decoder 102, and latched to R2 on application of latch signal L2 by the instruction decoder.

In the second step of the program, x >>> 1 indicates an unsigned shift of x by one bit to the right. The complete step here therefore requires (i) shifting word x by one bit to the right; (ii) masking the resulting word using the mask 0x55555555; and (iii) adding the result to word a, the resulting word being defined as new word a. Thus, word x in register R1 is supplied to shift unit 105 through appropriate setting of control signal s5, and shift signal ss is set to indicate a 1-bit right shift by the instruction decoder 102. The resulting shifted word output by unit 105 is latched to register R1 through appropriate application of s1 and L1 by the instruction decoder 102. (It will be seen that the provision of separate execution units 104 and 105 here allows this operation to be performed concurrently with the initial masking operation described above). The shifted word in R1 is then supplied as before to &-unit 104, along with mask m=0x5555555, and the resulting masked word output by unit 104 is stored in register R1. To complete this step of the program, by appropriate setting of control signal s6 the contents of R1 and R2 are supplied to the add-unit 106 for addition, and the resulting word (new word a) is latched to R2.

In the third step of the program, a new word x is defined as word a masked with 0x33333333. Thus, the contents of R2 are supplied to &-unit 4 together with the mask m=0x33333333 from the instruction decoder 102, and the resulting word (new x) is latched to register R1. In the fourth step, word a is right-shifted by 2, masked with 0x33333333, and summed with word x to obtain a new word x. Thus, the contents of R2 are supplied to shift unit 105 along with control signal ss indicating a 2-bit shift to the right, and the result is latched to register R2. (Again this step can be performed concurrently with the preceding masking step). The contents of R2 are then supplied to &-unit 104 together with mask m=0x33333333, and the result is again latched to R2. The contents of R1 and R2 are then supplied to add-unit 106 wherein the words are summed, and the resulting word (new x) is latched to R1.

The fifth and sixth steps of the program correspond to steps 1 and 2 described above except that the mask m used in these steps is 0x0f0f0f0f and a right shift of 4-bits is performed in step 6. The resulting word (new word a) is stored in R2 at the end of these steps. In the seventh step of the program, word a is summed with word a right-shifted by 8-bits, and the result defined as new word a. Thus, the contents of R2 are supplied to shift unit 105, with control signal ss from the instruction unit indicating a right-shift by 8-bits, and the resulting shifted word is latched to R1. The contents of R1 and R2 are then supplied to, and summed by, add-unit 106, and the resulting word (new word a) is latched to R2. The eighth step of the program repeats step seven but with a right shift of 16-bits.

The final step of the program defines the required output as word a masked with 0xff. That is, the least-significant 8-bits of word a give the required output. Thus, the least significant eight bit-lines of the output 8 of register R2 can be read out under control of the instruction decoder as the sum value giving the number of set bits in the original input word.

FIG. 2 shows various stages in the processing of an input data word demonstrating operation of the method just described. Line (1) of this figure shows the input data word x which is taken as a word of 32 set bits for clarity. Line (2) shows the intermediate word resulting from the masking operation x & 0x55555555. It can be seen that this intermediate word consists of sixteen 2-bit fields as indicated by the broken lines in the figure, where each 2-bit field represents the value (in this case 1) of a respective one of sixteen bits of the input word. Line (3) shows a second intermediate word resulting from the shift and mask operations (x >>> 1) & 0x55555555. This intermediate word has sixteen 2-bit fields respectively representing the values of the remaining sixteen bits of the input word. Line (4) shows the derivative word (word a) produced by summing the two intermediate words. This derivative word has sixteen 2-bit fields each of which represents the sum (in this case 2) of a respective pair of bits of the input word.

Line (5) shows the further intermediate word resulting from masking the derivative word obtained in line (4) according to a & 0x33333333. It can be seen that this intermediate word consists of eight 4-bit fields each of which represents the value (here 2) of a respective one of eight of the fields of the derivative word. Line (6) shows a second intermediate word resulting from masking and shifting the derivative word of line (4) according to (a >>> 2) & 0x33333333. This intermediate word also has eight 4-bit fields respectively representing the values of the remaining eight fields of the derivative word. Line (7) shows the new derivative word (new x) obtained by summing the two intermediate words of lines (5) and (6). The new derivative word has eight 4-bit fields each representing the value (here 4) of the sum of a respective pair of fields, one from each intermediate word.

Line (8) shows the further intermediate word obtained by masking the derivative word of line (7) according to x & 0x0f0f0f0f. This word has four 8-bit fields each representing the value of a respective one of the eight fields of the derivative word of line (7). Line (9) shows a second intermediate word obtained by masking and shifting the derivative word of line (7) according to (x >>> 4) & 0x0f0f0f0f. This intermediate word also has four 8-bit fields respectively representing the values of the remaining four fields of the derivative word. Line (10) shows the new derivative word (new a) obtained by summing the intermediate words of lines (8) and (9). The new derivative word has four 8-bit fields each representing the value (here 8) of the sum of a respective pair of fields, one from each intermediate word.

Lines (11) and (12) show the new derivative word a, and word a right-shifted by 8-bits, respectively. Line (13) shows the result of summing lines (11) and (12) to obtain new word a. Similarly, lines (14) and (15) show the new word a, and word a right-shifted by 16-bits, respectively, and line (16) shows the result of summing lines (14) and (15) to obtain new word a. Lines (17) and (18) show new word a and 0xff respectively, from which it is apparent that the mask operation a & 0xff (equivalent to reading the eight least-significant bits of word a) gives the required sum value 0010000, ie. decimal 32.

In the above example the method is initially iterative, shifting and masking operations being performed to generate intermediate words which are then summed to produce a derivative word from which further intermediate words with larger bit-fields are then generated, and so on. The iterative process could be continued beyond line (10) above until a single derivative word with one 32-bit field is obtained, this field representing the required sum value. That is, after step (10), two intermediate words having two 16-bit fields could be produced by the operations a & 0x00ff00ff and (a >>> 8) & 0x00ff00ff, these then being summed to produce a derivative word (new a) with two 16-bit fields. This derivative word may then be used to produce two intermediate words having one 32-bit field by the operations a & 0x0000ffff and (a >>> 16) & 0x0000ffff, the sum of these giving the required sum value. However, once a derivative word is obtained with $x_i$-bit fields where $2^{x_i} > n$, these fields can be summed without overflow since the maximum number n of set bits in the original input word can be represented by $x_i$ bits. These fields can therefore be summed simply by performing shift and add operations as demonstrated above, avoiding unnecessary masking steps.

In the iterative steps of the above example, two intermediate (n=32)-bit words with bit fields of twice the previous size are produced in each iteration. While this is a particularly simple method, in general $p_1$ intermediate n-bit words can be produced in the first step with $n/p_1$ $p_1$-bit fields where $1<p_1<n$, and in subsequent steps $p_i$ intermediate n-bit words can be generated, where $1<p_i<n$, each having $n/x_i$ $x_i$-bit fields, where $x_i=p_i*x_{i-1}$ and $x_1=p_1$, and where i=2 in a first pass and i=i+1 in each subsequent pass.

Figures 3, 4, 5, 6:
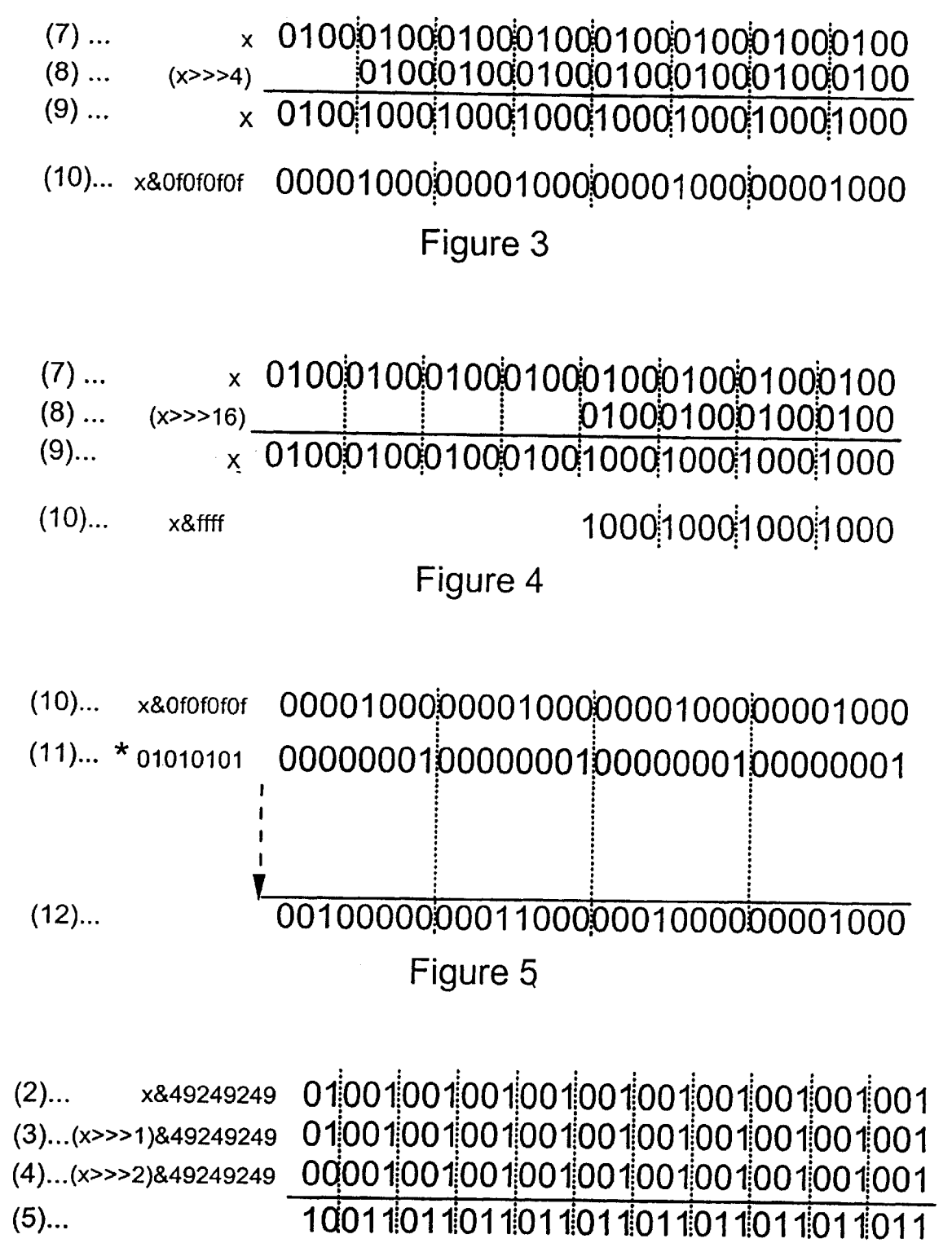

The main purpose of masking a derivative word to generate intermediate words with larger bit-fields is to allow groups of these fields to be summed without overflow, that is without the resulting sum bit-strings exceeding the available field size. Thus, at any stage in the iterative process for a derivative word with $x_{i-1}$-bit fields, if the maximum possible value V of the sum of $q \geq 2$ fields of the derivative word satisfies $V<2^{x_{i-1}}$, these fields can be summed in groups of q fields without overflow. The derivative word x in line (7) of FIG. 2 provides an example of this situation. The maximum possible value of any one of these 4-bit fields is 4, so the maximum possible sum of two fields is 8, and 8 can be represented by a 4-bit field. The subsequent pass of the iterative process can therefore be modified as illustrated in FIG. 3. Here, line (7) shows the derivative word x obtained at line (7) of FIG. 2. Line (8) shows x right-shifted by 4-bits, and line (9) shows the result (new x) obtained by adding lines (7) and (8). This word is then masked according to x & 0x0f0f0f0f, which eliminates the redundant fields in line (9), to obtain the new derivative word (new x) shown in line (10) having four 8-bit fields each representing the sum of a respective pair of fields of the previous derivative word. Line (10) in FIG. 3 corresponds to line (10) of FIG. 2, but the result is obtained with fewer masking operations than in the FIG. 2 method. The following Java program defines a method employing the modification of FIG. 3.

```
public static int sumz (int x) {
    int a = 0x55555555 & x;
    a += (x >>> 1) & 0x55555555;
    x = a & 0x33333333;
    x += (a >>> 2) & 0x33333333;
    x += x >>> 4;
    a = x & 0x0f0f0f0f;
    a += (x >>> 8) & 0x0f0f0f0f;
    a += a >>> 16;
    return a & 0xff;
}
```

Implementation of this method by the processor of FIG. 1b will be apparent from the foregoing description.

In the modification of FIG. 3, the $x_{i-1}$-bit fields of the initial derivative word are summed in groups of q=2 fields and the new derivative word has $32/x_i$ $x_i$-bit fields where $x_i=2x_{i-1}$. An alternative to this method is illustrated in FIG. 4. Here, line (7) shows the derivative word x as before, and line (8) shows x right-shifted by 16-bits. Line (9) shows the result of summing lines (7) and (8) to obtain new word x, and line (10) shows the result of masking x with 0xffff to eliminate the redundant fields. Here, the resulting derivative word is an (n'=n/2=16)-bit word having four ($x_i=x_{i-1}=4$)-bit fields, each of which represents the sum of a respective group of 8-bits of the original data word. The subsequent processing of the derivative word can continue according to the generalized process described above with n replaced by n'.

When generating intermediate words in the iterative stages of the methods described above, the derivative word is shifted before masking. While this reduces the number of masks m required by the process, in some methods masking may be performed before shifting. The following Java program provides an example of this.

```
public static int sumq (int x) {
    int a = 0x55555555 & x;
    a += (x & 0xaaaaaaaa) >>> 1;
    x = a & 0x33333333;
    x += (a & 0xcccccccc) >>> 2;
    x += x >>> 4;
    x & = 0x0f0f0f0f;
    x += x >>> 8;
    x += x >>> 16;
    return x & 0xff;
}
```

Referring again to FIG. 2, in lines (11) to (17) of this method the 8-bit fields of the derivative word are summed by performing successive shift and add operations. While shifting and adding can be performed as shown in FIG. 2, in preferred embodiments the shift and add operations are performed by multiplication of the derivative word as illustrated for example in FIG. 5. Here, line (10) corresponds to line (10) of FIG. 3 and line (11) shows the appropriate multiplier 01010101 in this case. Consideration of this multiplication as a series of shifts followed by an add operation shows that the result is given by the eight most-significant bits in line (12). These can be read from the eight most-significant bit-lines of the output of the appropriate register in the processor of FIG. 1b to obtain the required sum value. The following Java program defines a complete method using this modification.

```
public static int sum (int x) {
    int a = 0x55555555 & x;
    a += (x >>> 1) & 0x55555555;
    x = a & 0x33333333;
    x += (a >>> 2) & 0x33333333;
    x += x >>> 4
    x &= 0x0f0f0f0f;
    x = (x * 0x01010101);
    return x >>> 24;
}
```

While the above examples have focused on methods where two intermediate words are produced at each stage, it will be apparent that this is not essential and more than two intermediate words may be produced at any given stage. By way of example, FIG. 6 shows an alternative to the initial stages of FIG. 2 where three intermediate words are generated. Line (2) here shows the intermediate word produced by masking x with 0x49249249. This intermediate word has 32/3 3-bit fields whereby one field, here the left-hand field, is a partial field having only two bits. Line (3) shows a second intermediate word resulting from shifting and masking according to (x >>> 1) & 49249249. Line (4) shows a third intermediate word resulting from shifting and masking according to (x >>> 2) & 49249249. It can be seen that, overall, 32 of the fields of these intermediate words represent the values of respective bits of the original data word. Line (5) shows the derivative word obtained by summing the intermediate words. Again this has 32/3 3-bit fields, and each of these fields represents the sum of a respective group of bits of the original data word. Implementation of this example, where three intermediate words are generated, may make use of the third register R3 in the processor of FIG. 1b if the words are summed in a single step. Subsequent processing of the derivative word to obtain the required sum value can be performed in various ways using the principles demonstrated by the examples already described. One example of such a method is illustrated by the following Java program.

```
public static int sumzz(int x) {
    int t1 = x & 0x49249249;
    int t2 = (x >>> 1) & 0x49249249;
    int t3 = (x >>> 2) & 0x49249249;
    t1 += t2;
    t1 += t3;
    t2 = t1 >>> 30;
    t1 *= 9;
    t1 &= 0x38e38e38;
    t1 *= 0x01041041;
    t1 >>>= 27;
    t1 += t2;
    return t1;
}
```

In this particular example, the intermediate words shown in FIG. 6 are summed in two steps. Also, the two bits forming the left-hand partial bit-field in the resulting derivative word are then separated by shifting to simplify the subsequent multiplication steps, these bits being added back in the penultimate line of the program.

While methods have been illustrated above with reference to a 32-bit input word, methods embodying the invention can be applied equally to words of other lengths. By way of example, the following Java program defines a particular method for use with a 64-bit input word (long x).

```
public static int sum (long x) {
    long a = 0x5555555555555555L & x;
    a += (x >>> 1) & 0x5555555555555555L;
    x = a & 0x3333333333333333L;
    x += (a >>> 2) & 0x3333333333333333L;
    a = x & 0x0f0f0f0f0f0f0f0fL;
    a += (x >>> 4) & 0x0f0f0f0f0f0f0f0fL;
    x = a & 0x00ff00ff00ff00ffL;
    x += (a >>> 8) & 0x00ff00ff00ff00ffL;
    x += (x >>> 16);
    x += (x >>> 32);
    return (int)x & 0xff;
}
```

While some processors may employ 64-bit registers, the method can be implemented using 32-bit registers by employing two registers to store each 64-bit string as will be apparent to those skilled in the art.

Figure 7:
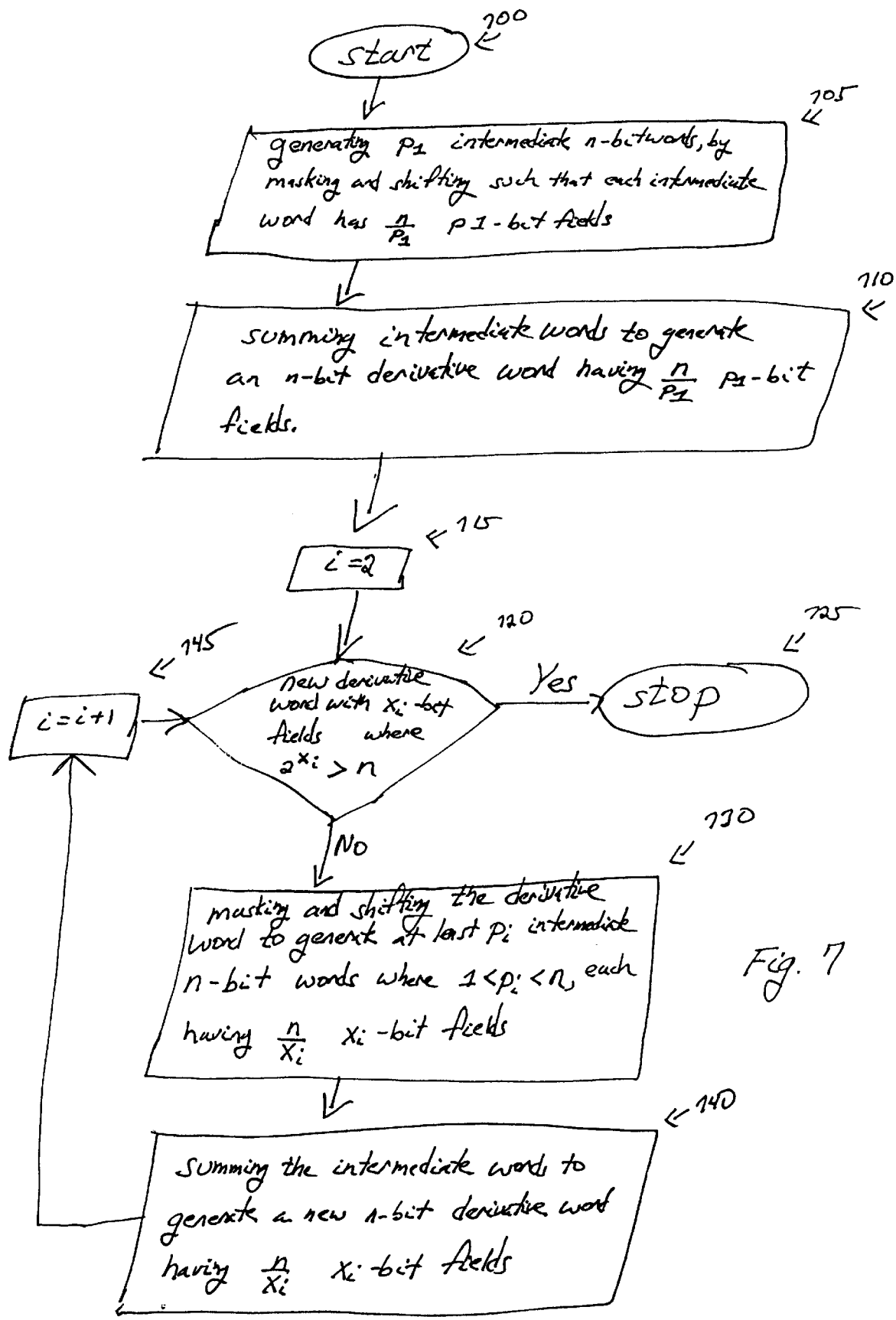
FIG. 7 is a flowchart that describes the operation of the preferred embodiment.

FIG. 7 is a flowchart that describes the operation of the preferred embodiment. At block 700 program 199 begins. Control then continues to block 705 where program 199 generates at least $p_1$ intermediate n-bit words, where $1<p_1<n$, by masking and shifting the data word such that each intermediate word has $n/p_1$ $p_1$-bit fields and n of the fields of the intermediate words represent the values of respective bits of the data word. Control then continues to block 710 where program 199 sums the intermediate words to generate an n-bit derivative word having $n/p_1$ $p_1$-bit fields whereby each field of the derivative word represents the sum of a respective group of bits of the data word. Control then continues to block 715 where program 199 initializes the variable "i" to be 2.

Control then continues to block 720 where program 199 determines whether a new derivative word with $x_i$-bit fields is obtained where $2^{x_i}>n$. If the determination at block 720 is true, then control continues to block 725 where program 199 stops.

If the determination at block 720 if false, then control continues to block 730 where program 199 mask and shifts the derivative word to generate at least $p_i$ intermediate n-bit words, where $1<p_i<n$ and i=2 in a first pass, each having $n/x_i$ $x_i$-bit fields, where $x_i=p_i*x_{i-1}$ and $x_1=p_1$, $n/x_{i-1}$ of which fields represent the values of respective fields of the derivative word.

Control then continues to block 740 where program 199 sums the intermediate words to generate a new n-bit derivative word having $n/x_i$ $x_i$-bit fields, each of which represents the sum of a respective group of bits of the data word.

Control then continues to block 745 where program 199 increments the variable "i" by one. Control then continues to block 720 as previously described above.

It will be seen that the above embodiments provide highly efficient methods of counting set bits in a data word. Methods embodying the invention can be implemented using shift, add and mask operations without requiring branching or lookup operations, and the time taken is independent of the content of the data word. Processing time can be further reduced by employing multiple concurrent execution units in the processor as in the example given above. It will be appreciated, however, that many changes and modifications can be made to the specific embodiments described without departing from the scope of the invention. For example, the number of registers provided in the processor may be varied according to the requirements of a particular system. As a further example, while three concurrent execution units, each dedicated to a particular operation, are described above, in general one or more execution units, which may or may not perform more than one type of operation, may be used as desired.

We claim:

1. A method of counting the number of set bits in an n-bit data word in a data processing system, the method comprising:

generating at least $p_1$ intermediate n-bit words, where $1<p_1<n$, by masking and shifting the data word such that each intermediate word has $n/p_1$ $p_1$-bit fields and n of the fields of the intermediate words represent the values of respective bits of the data word;

summing the intermediate words to generate an n-bit derivative word having $n/p_1$ $p_1$-bit fields whereby each field of the derivative word represents the sum of a respective group of bits of the data word; and summing the fields of the derivative word by performing shift, add and mask operations on the derivative word, whereby the resulting sum value represents the number of set bits in the data word.

2. The method of claim 1, wherein the summing the fields step further comprises:

masking and shifting the derivative word to generate at least $p_i$ intermediate n-bit words, where $1<p_i<n$ and i=2 in a first pass, each having $n/x_i$ $x_i$-bit fields, where $x_i=p_i*x_{i-1}$ and $x_1=p_1$, $n/x_{i-1}$ of which fields represent the values of respective fields of the derivative word.

3. The method of claim 2, wherein the summing the fields step further comprises:

summing the intermediate words to generate a new n-bit derivative word having $n/x_i$ $x_i$-bit fields, each of which represents the sum of a respective group of bits of the data word.

4. The method of claim 3, further comprising:

iteratively performing the masking and shifting step and the summing the intermediate words to generate a new n-bit derivative word step, for the new derivative word with i=i+1 in each successive pass, at least until a new derivative word with $x_i$-bit fields is obtained where $2^{x_i}>n$.

5. The method of claim 4 wherein during any iterative pass, for a derivative word having $x_{i-1}$-bit fields, if the maximum possible value V of the sum of $q\geq 2$ fields of the derivative word satisfies $V<2^{x_{i-1}}$, the masking and shifting step and the summing the intermediate words step further comprise:

summing fields of the derivative word in groups of q fields by performing shift and add operations on the derivative word and masking the resulting word to eliminate redundant fields, thereby generating a new derivative word having $x_i$-bit fields each of which represents the sum of respective groups of bits of the data word.

6. The method of claim 5, wherein the shift, add, and masking operations cause the new derivative word to be an n-bit word having $n/x_i$ $x_i$-bit fields, where $x_i=q*x_{i-1}$.

7. The method of claim 5 wherein the shift, add, and masking operations are performed such that $x_i=x_{i-1}$ and the new derivative word has $n'=n/q$ bits, and wherein in subsequent iterative passes, n is replaced by n'.

8. The method of claim 3, further comprises:
iteratively performing the masking and shifting step and the summing the intermediate words to generate a new n-bit derivative word step, until a new derivative word is obtained with one ($x_i=n$)-bit field, whereby the one field represents the resulting sum value.

9. The method of claim 4, wherein the iteratively performing step further comprises:
when a new derivative word is obtained with $x_i$-bit fields, summing the $x_i$-bit fields by performing shift and add operations on the derivative word to obtain the resulting sum value.

10. The method of claim 7, wherein the shift and add operations to obtain the resulting sum value are implemented by multiplication of the derivative word.

11. The method of claim 1, wherein $p_1=2$.

12. The method of claim 1, wherein $p_1=3$.

13. The method of claim 1, wherein $p_i=P_1$.

14. The method of claim 1, wherein n=32.

15. A data processing system, comprising:
a processor;
storage coupled to the processor; and
program code residing in the storage and executing on the processor, wherein the program code configures the processor to perform:
generating at least $p_1$ intermediate n-bit words, where $1<p_1<n$, by masking and shifting a data word such that each intermediate word has $n/p_1$ $p_1$-bit fields and n of the fields of the intermediate words represent the values of respective bits of the data word;
summing the intermediate words to generate an n-bit derivative word having $n/p_1$ $p_1$-bit fields whereby each field of the derivative word represents the sum of a respective group of bits of the data word; and
summing the fields of the derivative word by performing shift, add and mask operations on the derivative word, whereby the resulting sum value represents the number of set bits in the data word.

16. The data processing system of claim 15, wherein the summing the fields step further comprises:
masking and shifting the derivative word to generate at least $p_i$ intermediate n-bit words, where $1<p_i<n$ and i=2 in a first pass, each having $n/x_i$ $x_i$-bit fields, where $x_i=p_i*x_{i-1}$ and $x_1=p_1$, $n/x_{i-1}$ of which fields represent the values of respective fields of the derivative word.

17. The data processing system of claim 16, wherein the summing the fields step further comprises:
summing the intermediate words to generate a new n-bit derivative word having $n/x_i$ $x_i$-bit fields, each of which represents the sum of a respective group of bits of the data word.

18. The data processing system of claim 17, further comprising:
iteratively performing the masking and shifting step and the summing the intermediate words to generate a new n-bit derivative word step, for the new derivative word with i=i+1 in each successive pass, at least until a new derivative word with $x_i$-bit fields is obtained where $2^{x_i}>n$.

19. The data processing system of claim 18 wherein during any iterative pass, for a derivative word having $x_{i-1}$-bit fields, if the maximum possible value V of the sum of $q\geq 2$ fields of the derivative word satisfies $V<2^{x_{i-1}}$, the masking and shifting step and the summing the intermediate words step further comprise:
summing fields of the derivative word in groups of q fields by performing shift and add operations on the derivative word and masking the resulting word to eliminate redundant fields, thereby generating a new derivative word having $x_i$-bit fields each of which represents the sum of respective groups of bits of the data word.

20. The data processing system of claim 19, wherein the shift, add, and masking operations cause the new derivative word to be an n-bit word having $n/x_i$ $x_i$-bit fields, where $x_i=q*x_{i-1}$.

21. The data processing system of claim 19 wherein the shift, add, and masking operations are performed such that $x_i=x_{i-1}$ and the new derivative word has $n'=n/q$ bits, and wherein in subsequent iterative passes, n is replaced by n'.

22. The data processing system of claim 17, further comprising:
iteratively performing the masking and shifting step and the summing the intermediate words to generate a new n-bit derivative word step, until a new derivative word is obtained with one ($x_i=n$)-bit field, whereby the one field represents the resulting sum value.

23. The data processing system of claim 18, wherein the iteratively performing step further comprises:
when a new derivative word is obtained with $x_i$-bit fields, summing the $x_i$-bit fields by performing shift and add operations on the derivative word to obtain the resulting sum value.

24. The data processing system of claim 21, wherein the shift and add operations to obtain the resulting sum value are implemented by multiplication of the derivative word.

25. The data processing system of claim 15, wherein $p_1=2$.

26. The data processing system of claim 15, wherein $p_1=3$.

27. The data processing system of claim 15, wherein $p_i=p_1$.

28. The data processing system of claim 15, wherein n=32.

29. A computer program product comprising computer program code which, when loaded in a processor of a data processing system, configures the processor to perform the following steps:
generating at least $p_1$ intermediate n-bit words, where $1<p_1<n$, by masking and shifting a data word such that each intermediate word has $n/p_1$ $p_1$-bit fields and n of the fields of the intermediate words represent the values of respective bits of the data word;

summing the intermediate words to generate an n-bit derivative word having $n/p_1$ $p_1$-bit fields whereby each field of the derivative word represents the sum of a respective group of bits of the data word; and summing the fields of the derivative word by performing shift, add and mask operations on the derivative word, whereby the resulting sum value represents the number of set bits in the data word.

30. The program product of claim 29, wherein the summing the fields step further comprises:

masking and shifting the derivative word to generate at least $p_i$ intermediate n-bit words, where $1<p_i<n$ and $i=2$ in a first pass, each having $n/x_i$ $x_i$-bit fields, where $x_i=p_i*x_{i-1}$ and $x_1=p_1$, $n/x_{i-1}$ of which fields represent the values of respective fields of the derivative word.

31. The program product of claim 30, wherein the summing the fields step further comprises:

summing the intermediate words to generate a new n-bit derivative word having $n/x_i$ $x_i$-bit fields, each of which represents the sum of a respective group of bits of the data word.

32. The program product of claim 31, further comprising:

iteratively performing the masking and shifting step and the summing the intermediate words to generate a new n-bit derivative word step, for the new derivative word with $i=i+1$ in each successive pass, at least until a new derivative word with $x_i$-bit fields is obtained where $2^{x_i}>n$.

33. The program product of claim 32 wherein during any iterative pass, for a derivative word having $x_{i-1}$-bit fields, if the maximum possible value V of the sum of $q \geq 2$ fields of the derivative word satisfies $V<2^{x_{i-1}}$, the masking and shifting step and the summing the intermediate words step further comprise:

summing fields of the derivative word in groups of q fields by performing shift and add operations on the derivative word and masking the resulting word to eliminate redundant fields, thereby generating a new derivative word having $x_i$-bit fields each of which represents the sum of respective groups of bits of the data word.

34. The program product of claim 33, wherein the shift, add, and masking operations cause the new derivative word to be an n-bit word having $n/x_i$ $x_i$-bit fields, where $x_i=q*x_{i-1}$.

35. The program product of claim 33 wherein the shift, add, and masking operations are performed such that $x_i=x_{i-1}$ and the new derivative word has $n'=n/q$ bits, and wherein in subsequent iterative passes, n is replaced by n'.

36. The program product of claim 31, further comprising:

iteratively performing the masking and shifting step and the summing the intermediate words to generate a new n-bit derivative word step, until a new derivative word is obtained with one ($x_i=n$)-bit field, whereby the one field represents the resulting sum value.

37. The program product of claim 32, wherein the iteratively performing step further comprises:

when a new derivative word is obtained with $x_i$-bit fields, summing the $x_i$-bit fields by performing shift and add operations on the derivative word to obtain the resulting sum value.

38. The program product of claim 35, wherein the shift and add operations to obtain the resulting sum value are implemented by multiplication of the derivative word.

39. The program product of claim 29, wherein $p_1=2$.
40. The program product of claim 29, wherein $p_1=3$.
41. The program product of claim 29, wherein $p_i=p_1$.
42. The program product of claim 29, wherein $n=32$.

* * * * *